(12) United States Patent
Kato (10) Patent No.: US 7,073,644 B2
(45) Date of Patent: Jul. 11, 2006

(54) ANTI-VIBRATION SYSTEM FOR USE IN EXPOSURE APPARATUS

(75) Inventor: Hiroaki Kato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 341 days.

(21) Appl. No.: 10/329,828

(22) Filed: Dec. 27, 2002

(65) Prior Publication Data

US 2003/0146554 A1   Aug. 7, 2003

(30) Foreign Application Priority Data

Jan. 4, 2002  (JP) .............................. 2002-000014

(51) Int. Cl.
  *F16F 7/10* (2006.01)
  *F16M 1/00* (2006.01)
  *F16M 13/00* (2006.01)

(52) U.S. Cl. .................. 188/378; 267/136; 248/550

(58) Field of Classification Search ............... 188/266, 188/378–380, 315; 267/64.11, 64.28, 136; 248/550, 636, 638, 562, 566; 355/53, 73; 318/560, 625; 700/280; 108/147, 20
See application file for complete search history.

(56) References Cited

U.S. PATENT DOCUMENTS

| | | | |
|---|---|---|---|
| 5,653,317 A * | 8/1997 | Wakui ......................... | 188/378 |
| 6,021,991 A * | 2/2000 | Mayama et al. ............ | 248/550 |
| 6,286,644 B1 * | 9/2001 | Wakui ......................... | 188/378 |
| 6,684,132 B1 * | 1/2004 | Wakui et al. ................ | 700/280 |
| 2003/0057346 A1 * | 3/2003 | Wakui ......................... | 248/550 |
| 2003/0146554 A1 * | 8/2003 | Kato ............................ | 267/136 |

FOREIGN PATENT DOCUMENTS

| | | | |
|---|---|---|---|
| JP | 11-141599 | * | 5/1999 |
| JP | 11305845 A | * | 11/1999 |
| JP | 2000-154843 | * | 6/2000 |
| JP | 2000-208402 | * | 7/2000 |
| JP | 2002-364702 | * | 12/2002 |

* cited by examiner

*Primary Examiner*—Xuan Lan Nguyen (74) *Attorney, Agent, or Firm*—Fitzpatrick, Cella, Harper & Scinto (57) ABSTRACT

In order to control an internal pressure of an air spring appropriately without being influenced by a change in supply pressure, an anti-vibration system includes an air spring as an actuator for an anti-vibration table, a pressure control valve for controlling the internal pressure of the air spring, a pressure sensor for detecting the air supply pressure to the pressure control valve, a driving system for actuating the pressure control valve in accordance with a detection signal of the pressure sensor, and a variable gain compensation system for performing variable gain compensation to an input signal to the driving system for the pressure control valve, on the basis of the detection signal of the pressure sensor.

11 Claims, 5 Drawing Sheets

ANTI-VIBRATION SYSTEM FOR USE IN
EXPOSURE APPARATUS

FIELD OF THE INVENTION AND RELATED
ART

This invention relates generally to an anti-vibration system for use in a semiconductor manufacturing apparatus and, specifically, having an air spring as an actuator. In other aspects, the invention concerns an anti-vibration method, an anti-vibration system control method, and an exposure apparatus having such an anti-vibration system.

Improvements in the precision of precision instruments such as electronic microscopes and semiconductor manufacturing apparatuses, for example, have required further improvements in performance of a precision anti-vibration system on which such a precision instrument is to be mounted. Particularly, semiconductor manufacturing apparatuses need an anti-vibration system capable of isolating external vibration such as floor vibration as much as possible, so as to assure appropriate and quick exposure operations. The reason is that, where a semiconductor wafer is to be exposed by use of what is called a stepper, an exposure X-Y stage positioned with respect to a projection lens must be placed in a completely stopped state.

Further, since the exposure X-Y stage is featured by the intermittent motion of a step-and-repeat operation, the repeated stepwise motion excites vibration of an anti-vibration table.

For these reasons, in the anti-vibration systems, an anti-vibration performance in relation to external vibration as well as a damping performance with respect to vibration caused by the operation of an instrument itself mounted thereon should be accomplished in well balance.

In order to meet this, anti-vibration systems of what can be called active type have been developed practically, in which vibration of an anti-vibration table is detected by a vibration sensor and the anti-vibration table is driven by an actuator in response to a detection signal of the sensor. Such active type anti-vibration systems can achieve balanced anti-vibration performance and damping performance, which are not attainable with conventional anti-vibration systems which comprise a spring and a supporting mechanism having a damper characteristic. The active type anti-vibration system usually has an air spring as an actuator. Because of its structure, the air spring can produce a large thrust easily, so it can stably support a heavy weight such as a main unit of a semiconductor manufacturing apparatus. Further, due to the use of an air spring in an anti-vibration system, the natural vibration frequency of the supporting system thereof can be set at a low frequency such as a few Hz, such that a sufficient anti-vibration performance is assured with respect to external vibration having a high vibration frequency.

The air spring produces a thrust in accordance with the internal pressure thereof. The internal pressure is controlled by a pressure control valve, having pressure controllability. The pressure control valve has a pressure controllable range, ranging from the supply pressure of a supplied high pressure air to the exhaust pressure being open to the atmosphere. It operates to adjust a target pressure, in accordance with an input signal applied thereto. Namely, the problem of this pressure control valve, producing an output pressure, is that the output pressure of the pressure control valve is variable due to the influence of a change in the supply pressure.

The high pressure air is supplied to the pressure control valve via a supply pressure stabilizing means such as a pressure reducing valve. Since, however, the flow rate of the high pressure air flowing through the pressure control valve changes due to the operation of the pressure control valve, the supply pressure changes with the flow rate.

The pressure control valve is actuated in response to a detection signal of a vibration sensor. Here, usually, the anti-vibration system has a natural vibration frequency of about a few Hz, and the detection signal of the vibration sensor mainly comprises a frequency component not less than a few Hz. Although the pressure control valve operates in such a frequency band, the response speed of the supply pressure stabilizing means such as a pressure reducing valve is significantly lower than the natural vibration frequency of the anti-vibration system. While the supply pressure stabilizing means operates so as to maintain the supply pressure constant, it is impossible to assure the response performance that can follow the changes in the flow rate of the pressure control valve which operates at a high speed.

Inside the pressure control valve, the supply pressure is reduced to a target pressure by use of a throttle mechanism, to provide an output pressure. Thus, if the supply pressure decreases, the output pressure is influenced thereby and also decreases. Alternatively, if the supply pressure increases, the output pressure increases similarly. Thus, there is an inconvenience that, when the pressure control valve operates, the operation speed of the supply pressure stabilizing means which supplies a high pressure cannot follow it, such that the supply pressure changes and a desired output pressure cannot be produced in response to an input signal applied to the pressure control valve.

Further, depending on the setting environment in which the system is installed, it is possible that a change in supply pressure such as described above occurs. It has been desired to provide pressure control means that can stably hold a required anti-vibration performance even in such environment.

SUMMARY OF THE INVENTION

It is accordingly an object of the present invention to provide an anti-vibration system and/or an anti-vibration method by which the internal pressure of an air spring can be controlled suitably.

It is another object of the present invention to provide an exposure apparatus having such anti-vibration system.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Anti-vibration systems and methods according to preferred embodiments of the present invention will now be described with reference to the attached drawings.

Figure 1:
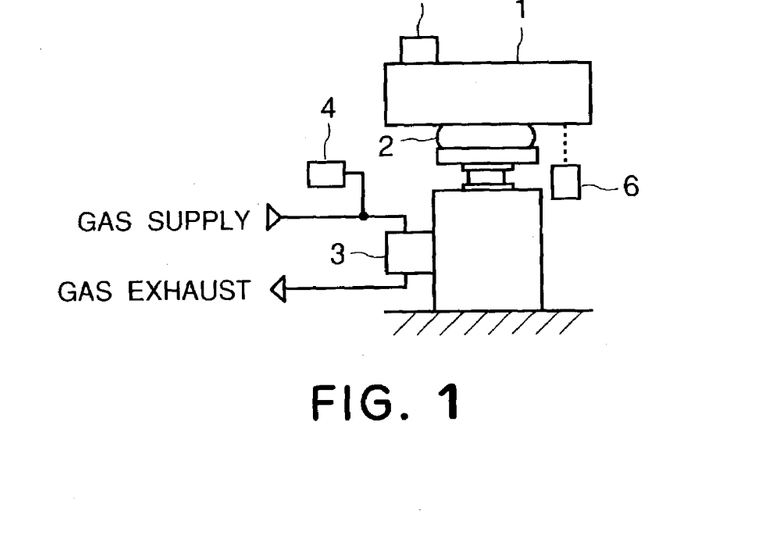
FIG. 1 is a schematic and diagrammatic view of an anti-vibration system according to one preferred embodiment of the present invention.

FIG. 1 illustrates the structure of an anti-vibration system according to an embodiment of the present invention. An anti-vibration table 1 is floatingly supported on the floor, by means of an air spring 2. The internal pressure of the air spring 2 is controlled by a pressure control valve 3, which is a pressure control valve having pressure controllability. In this active type anti-vibration system, the air spring 2 (actuator) applies a damping force to the anti-vibration table 1, thereby to control the vibration damping and the floated position of the anti-vibration table 1.

In this anti-vibration system, vibration of the anti-vibration table 1 is detected by a vibration sensor, and the pressure control valve 3 is actuated in response to a detection signal of the vibration sensor, by which the vibration of the anti-vibration table 1 is suppressed. As a vibration sensor to this end, there is an acceleration sensor 5 which is provided on the anti-vibration table 1. The acceleration sensor 5 can detect vibration of the anti-vibration table 1. Also, in this anti-vibration system, in order to hold the floated position of the anti-vibration table 1 at a constant position, there is a displacement sensor 6 which functions to detect the floated position of the anti-vibration table 1. In response to a detection signal of the displacement sensor 6, the pressure control valve 3 is actuated. A pressure sensor 4 detects the supply pressure of the pressure control valve 3. Here, the supply pressure refers to the pressure of a high pressure air to be supplied to the pressure control valve 3 through a pressure stabilizing mechanism such as a pressure reducing valve.

Figure 5:
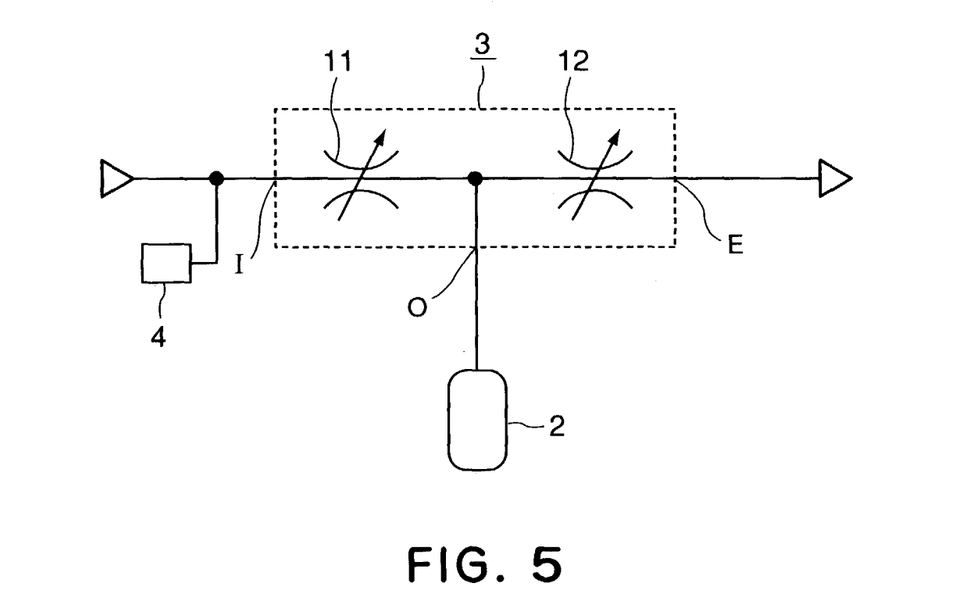
FIG. 5 is a diagrammatic view for explaining the structure of a pressure control valve according to an embodiment of the present invention.

Referring to FIG. 5, the operation of the pressure control valve 3 will be explained. The pressure control valve 3 comprises a three-port valve having an intake port I, an exhaust port E, and an output port O. The pressure control valve 3 receives the supply of a high pressure air at its intake port I. The supply pressure at the intake port I is detected by the pressure sensor 4. The exhaust port E is normally open to the atmosphere. The output port O is connected to the air spring 2, and the output pressure of the pressure control valve 3 is the same as the inside pressure of the air spring 2. There are throttle mechanisms 11 and 12 between the intake port I and the output port O and between the output port O and the exhaust port E, respectively. In accordance with the ratio of passage resistances of these throttle mechanisms 11 and 12, the output pressure is determined. The passage resistance of each of the throttle mechanisms 11 and 12 is variable. Typical mechanisms are nozzle flapper type, pivot type and so on. In the case of nozzle flapper type, flappers are actuated such that the passage resistances of the throttle mechanisms 11 and 12 are made variable. The high pressure air (working fluid) is exhausted constantly from the intake port I to the exhaust port E.

Figure 6:
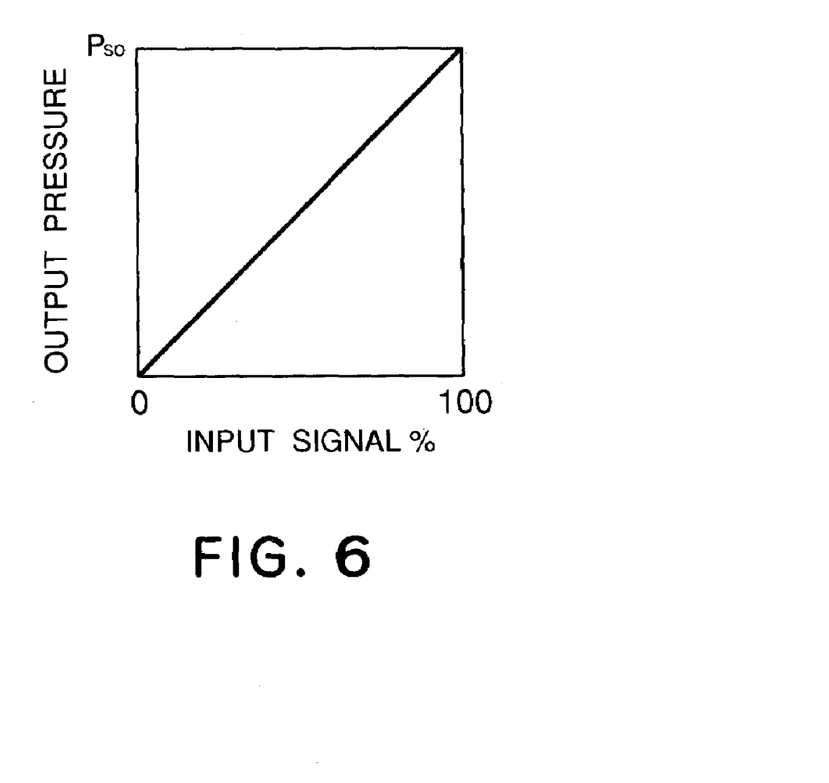
FIG. 6 is a graph for explaining an output characteristic of a pressure control valve according to an embodiment of the present invention.
Figure 7:
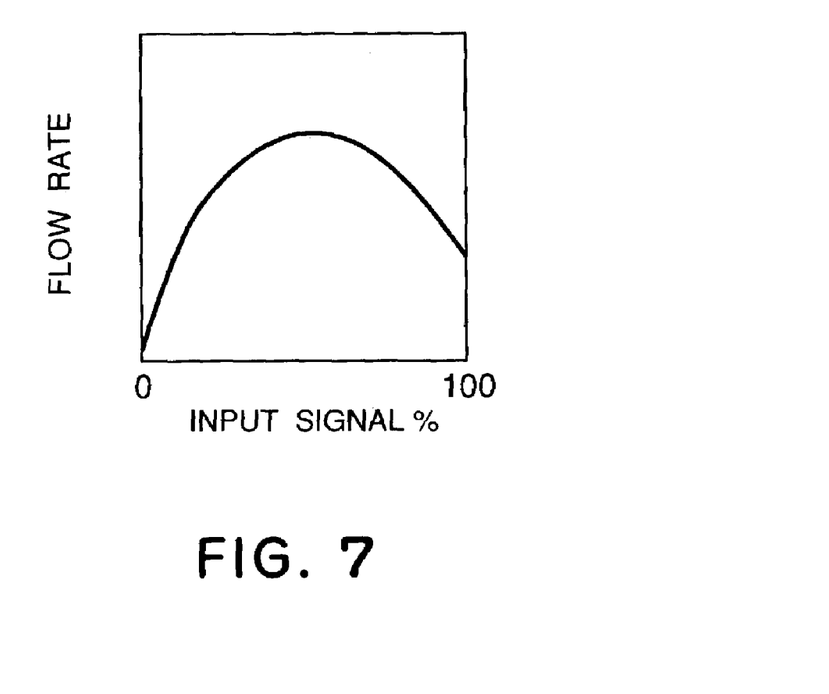
FIG. 7 is a graph for explaining a flow rate characteristic of a pressure control valve according to an embodiment of the present invention.

FIG. 6 shows the input-output characteristic of the pressure control valve 3. Symbol $P_{so}$ at the axis of ordinate denotes the supply pressure, and the pressure control valve 3 produces an output pressure from zero to $P_{so}$ in response to an input signal. The input signal and the output pressure are approximately proportional to each other. FIG. 7 is a graph for explaining the relation between the flow rate of the high pressure air (working fluid) and the input signal. Since the passage resistances of the throttle mechanisms 11 and 12 of the pressure control valve 3 are variable, the passage resistance to the flow of the high pressure air changes in accordance with the operation of the pressure control valve 3. Thus, the flow rate changes with the input signal, in the manner as shown in FIG. 7.

The high pressure air is supplied to the pressure control valve 3 by way of a supply pressure stabilizing means such as a pressure reducing valve. The pressure stabilizing means operates to maintain the supply pressure constant, regardless of the flow rate. If the operation of the air valve 3 is in a steady state, the supply pressure is constant. However, the pressure stabilizing means such as a pressure reducing valve has a slow response as compared with the pressure control valve 3. Therefore, from the structural reason, it is impossible to assure sufficient response characteristic. In the anti-vibration system, the pressure control valve 3 operates at a high speed, with the feedback of a detection signal of the acceleration sensor 5. Thus, the flow rate changes quickly in response to the operation of the pressure control valve. Therefore, correction of the supply pressure by the supply pressure stabilizing means can not follow it, and the supply pressure changes transitionally.

As shown in FIG. 5, the pressure control valve 3 produces an output pressure, while reducing the supply pressure by use of the throttle mechanism 11. Therefore, if the supply pressure changes, also the output pressure changes in proportion to it. If the supply pressure increases, the output pressure raises in proportion to it. To the contrary, if the supply pressure decreases, the output pressure decreases similarly. In order to assure that the pressure control valve 3 produces a desired output pressure in response to an input signal, appropriate compensation is provided so as to avoid the influence of the supply pressure change.

More specifically, in the anti-vibration system of this embodiment, the pressure sensor 4 detects the supply pressure, and the pressure control valve 3 is actuated in accordance with the detection signal of the sensor 4. Namely, the anti-vibration system of this embodiment has a feature that, in accordance with the supply pressure, variable gain compensation is performed to the input signal to be applied to driving means 7, for actuating the air valve 3.

Figure 2:
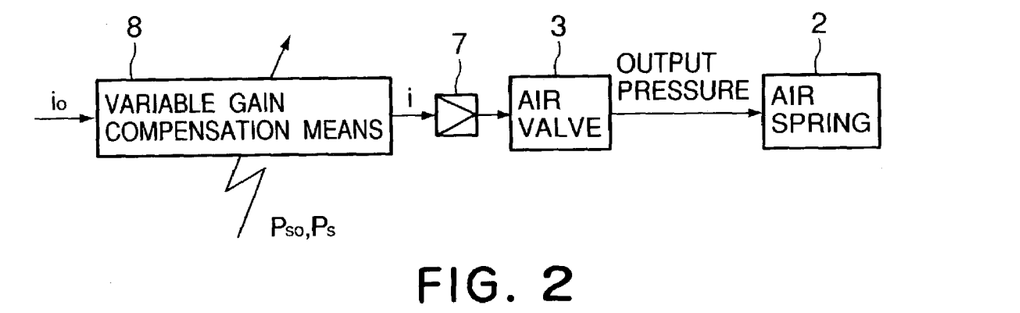
FIG. 2 is a diagrammatic view for explaining a control system having a variable gain compensation means, according to an embodiment of the present invention.

FIG. 2 shows the structure of a control system for the pressure control valve 3, having variable gain compensation means 8. Denoted in the drawing at $P_{so}$ is the supply pressure in equilibrium, and denoted at $P_s$ is the supply pressure detected in real time by the pressure sensor 4. Denoted at i is the input signal to be applied to the driving circuit 7 of the pressure control valve 3, and denoted at $i_0$ is the input signal under an assumption that the supply pressure $P_{so}$ is unchanged. The driving circuit 7 is a power amplifier for driving the pressure control valve 3 in accordance with the input signal i. Before the driving means 7, the variable gain compensation means 8 operates to avoid the influence of the change in supply pressure to the output pressure of the pressure control valve 3.

Figure 8:
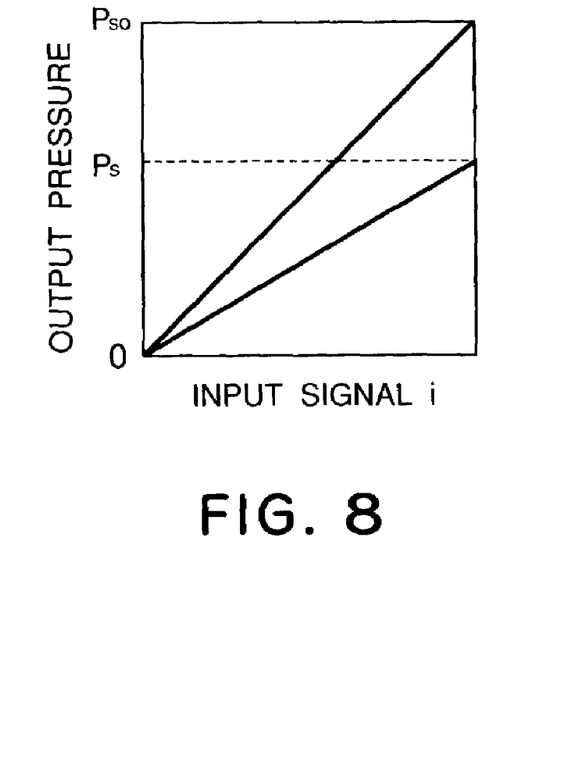
FIG. 8 is a graph for explaining a supply pressure to a pressure control valve according to an embodiment of the present invention, as well as the gain of the pressure control valve.

Referring to the input signal vs. output pressure diagram of FIG. 8, the operation principle of the variable gain compensation means 8 will be explained. As regards the output pressure of the pressure control valve 3, under equilibrium condition, the valve 3 produces an output pressure ranging from zero to supply pressure $P_{so}$, approximately in proportion to the input signal i. If the supply pressure reduces to $P_s$ transitionally due to the operation of the pressure control valve 3, the output pressure which can be produced is restricted to a range from zero to $P_s$. Thus, the gain of the output pressure to the input signal is lowered from $P_{so}$ to $P_s$. In order to keep the gain in equilibrium of $P_{so}$ even if the supply pressure decreases to $P_s$, the supply pressure ratio $P_{so}/P_s$ is multiplied to the input signal to thereby compensate for such decrease of the gain.

In the anti-vibration system according to this embodiment, the pressure control valve 3 is actuated in accordance with a detection signal of the displacement sensor 6 or of the acceleration sensor 5, to thereby control the vibration damping and floated position of the anti-vibration table 1. In FIG. 2, the input signal $i_0$ is produced while applying appropriate compensation to the detection signal of the displacement sensor 6 or acceleration sensor 5. The internal pressure of the air spring 2 (actuator) is controlled by the pressure control valve 3. Therefore, if the gain for the output pressure changes with the state of the supply pressure, it is unable to control the vibration damping and the floated position suitably. In accordance with the operation principle as has been explained with reference to FIG. 8, the variable gain compensation means 8 carries out the calculation of equation (1) below, to the input signal $i_0$, whereby the input signal i to the driving circuit 7 is produced.

$$i=(P_{so}/P_s) \times i_0 \quad (1)$$

With this procedure, the gain of the output pressure to the input signal $i_0$ can be held constant, regardless of the supply pressure. As a result, the internal pressure of the air spring 2 can be controlled suitably without being influenced by a change in supply pressure of the pressure control valve 3.

Here, it is seen from equation (1) that, if $P_{so}=P_s$ and the supply pressure is unchanged from the equilibrium, the gain of the variable gain compensation means 8 is equal to 1. Therefore, in this case, no compensation is performed to the input signal $i_0$.

Another embodiment of the present invention will be described. An anti-vibration system according to this embodiment is arranged so that the supply pressure is detected by a pressure sensor 4 and the pressure control valve 3 is actuated in response to a detection signal of the sensor, wherein, in accordance with the supply pressure, an offset signal is added to the input signal of driving means 7 which actuates the pressure control valve 3.

Figure 3:
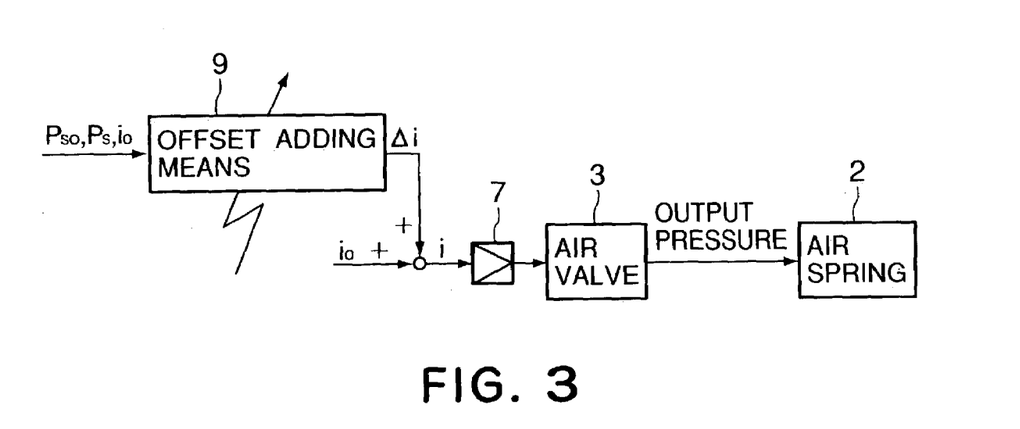
FIG. 3 is a diagrammatic view for explaining a control system having an offset adding means, according to an embodiment of the present invention.

FIG. 3 shows the structure of a control system for the pressure control valve 3, using offset adding means 9. Before the driving means 7 for driving the pressure control valve 3, the offset adding means 9 produces an offset signal Δi so as to compensate for the influence of a change in the supply pressure to the output pressure.

Figure 9:
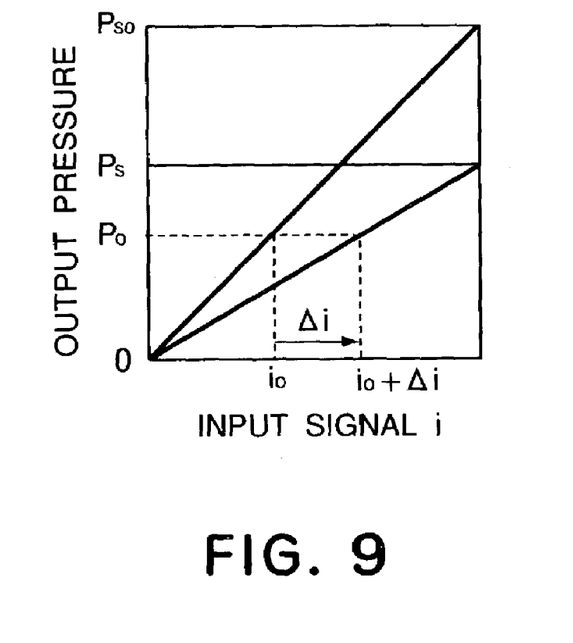
FIG. 9 is a graph for explaining an offset of the input signal and the supply pressure, in an embodiment of the present invention.

Referring to the input signal vs. output pressure diagram of FIG. 9, the operation principle of the offset adding means 9 will be explained. Here the output pressure to an input signal $i_0$ where the supply pressure $P_{so}$ is unchanged, is denoted by $P_0$. Even if the supply pressure decreases to $P_s$, since the output pressure $P_0$ is unchanged, the offset signal to be added to the input signal is denoted by Δi. The offset signal Δi is determined, as shown in equation (2) below, by the supply pressures $P_{so}$ and $P_s$ and the input signal $i_0$.

$$\Delta i=(P_{so}/P_s-1) \times i_0 \quad (2)$$

By changing the input signal from $i_0$ to $i_0+\Delta i$ as the supply pressure decreases from $P_{so}$ to $P_s$, the output pressure $P_0$ can be kept unchanged.

The offset adding means 9 produces an offset signal Δi in accordance with the operation of equation (2). As shown in equation (3) below, the input signal i to the driving means 7 corresponds to the sum of the input signal $i_0$ and the offset signal Δi.

$$i=i_0+\Delta i \quad (3)$$

Since the offset signal Δi is added to the input signal $i_0$ to the driving means 7 as shown in equation (3), the output pressure can be continuously held constant regardless of the supply pressure. Therefore, the internal pressure of the air spring 2 can be controlled suitably, without being influenced by changes in the supply pressure of the pressure control valve 3. Here, it will be seen from equation (2) that, where $P_{so}=P_s$ and the supply pressure is unchanged from the equilibrium, the offset signal is equal to zero such that no compensation is carried out to the input signal $i_0$.

A further embodiment of the present invention will be described. In an anti-vibration system according to this embodiment, the anti-vibration table is supported by use of plural air springs. Generally, for stable support of the anti-vibration table 1, three or more air springs 2 are used and they are disposed approximately symmetrically with respect to the gravity center position of the anti-vibration table 1. The anti-vibration system of this embodiment has a feature that pressure sensors for detecting the supply pressure are provided at respective intake passageways each being adapted to supply an air only to an associated pressure control valve.

Figure 4:
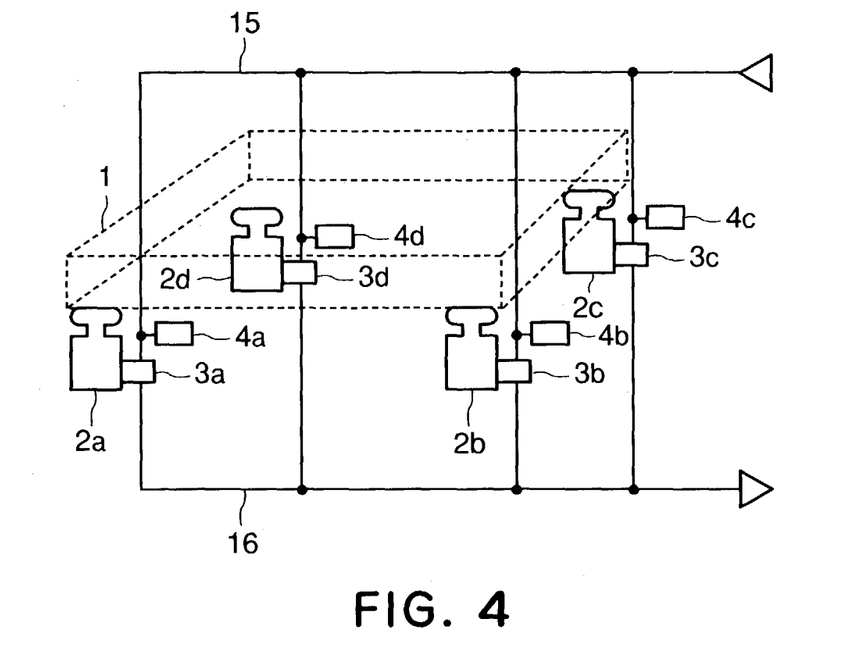
FIG. 4 is a diagrammatic view for explaining a pressure control valve, in one form of a pressure control valve according to an embodiment of the present invention, as well as disposition of pressure sensors.

FIG. 4 shows an example wherein an anti-vibration table 1 is supported by four air springs 2a, 2b, 2c, and 2d. The anti-vibration table 1 is supported at four corners thereof by means of the four air springs 2a–2d. The inside pressures of the air springs 2a–2d are controlled by pressure control valves 3a, 3b, 3c, and 3d, respectively. While a high pressure air is supplied only one intake port, concentratedly, the intake passageway 15 is branched in the neighborhood of the air springs 2a–2d, so that high pressure airs can be supplied to the pressure control valves 3a–3d, respectively. Further, an exhaust passageway 16 combines exhaust gases from the pressure control valves 3a–3d and directs them to a single exhaust port, concentratedly.

As shown in FIG. 4, pressure sensors 4a, 4b, 4c, and 4d are disposed on air supply passageways 15, respectively, each being branched from the intake port so as to supply an air only to an associated one of the pressure control valves 3a–3d. Where the driving operations of the pressure control valves 3a–3d are different, changes in the supply pressures of them are different, in dependence upon the branch of the air supply passageways 15.

The output pressure characteristic of the pressure control valve is determined by the supply pressure of the air supply passageway in close proximity to the pressure control valve. Therefore, in order to avoid the influence of the supply pressure change from the output pressure at the air valves 3a–3d, the pressure sensors 4a–4d for detecting the supply pressure should be disposed at positions on the air supply passageways which are very close to the air valves 3a–3d, respectively.

Namely, the pressure sensors 4a–4d are provided on passageways each being branched from the intake port and being adapted to supply an air only to an associated one of the pressure control valves 3a–3d.

The pressure control valve 3a is actuated in response to a detection signal of the supply pressure, detected by the pressure sensor 4a. As regards compensation means for avoiding the influence of the supply pressure change from the output pressure of the pressure control valve 3a, any one of the compensation means shown in FIGS. 2 and 3 may be used. Similarly, the pressure control valves 3b, 3c, and 3d operate in response to detection signals of the pressure sensors 4b, 4c, and 4d, respectively.

In this manner, in an anti-vibration system having plural air springs for supporting an anti-vibration table, the internal pressures of the air springs 2a–2d can be controlled appropriately, while avoiding the influence of the change in the supply pressure.

Although the embodiment of FIG. 4 shows an anti-vibration system having four air springs 2a–2d for supporting the anti-vibration table 1, the present invention can be embodied appropriately regardless of the number of air springs used.

Further, a semiconductor manufacturing apparatus having an anti-vibration system according to the present invention can be embodied appropriately, for various types of semiconductor manufacturing apparatuses, regardless of a used exposure method such as sequential exposure method or scanning exposure method.

(Embodiment of Exposure Apparatus)

Figure 10:
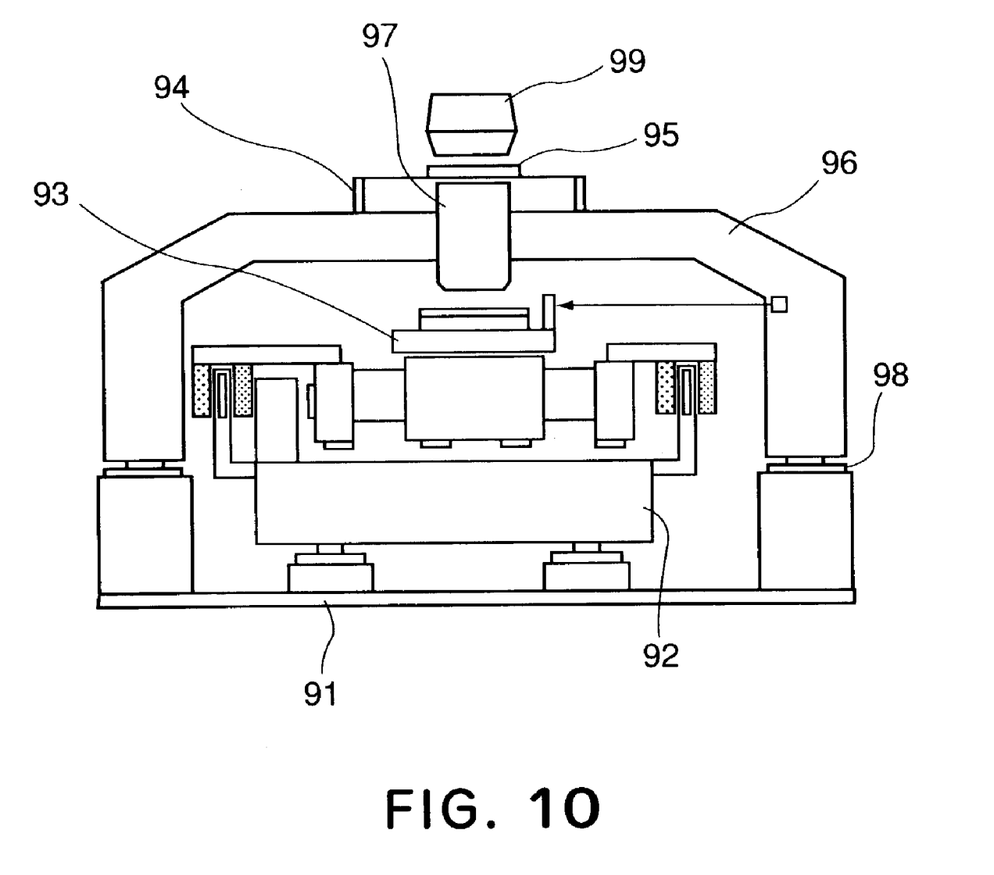
FIG. 10 is a schematic and elevational view of an embodiment of an exposure apparatus, into which an anti-vibration system according to the present invention is incorporated.

Referring now to FIG. 10, an embodiment of a scan type exposure apparatus will be described. This exposure apparatus comprise at least one of a reticle stage and a wafer sage, as a stage mechanism having an anti-vibration system according to any one of the embodiments described hereinbefore.

In FIG. 10, a barrel base 96 is supported by a floor or a base table 91, through dampers 98. The barrel base 96 functions to support a reticle stage base 94 as well as a projection optical system 97 which is positioned between a reticle stage 95 and a wafer stage 93.

The wafer stage 93 is supported on a stage base 92 which is supported by the floor or the base table 91. The wafer stage 93 serves to carry a wafer thereon and to perform positioning of the same. The reticle stage 95 is supported by the reticle stage base 94 which is supported by the barrel base 96. The reticle stage 95 is movable and it serves to carry thereon a reticle having a circuit pattern formed thereon. Exposure light for exposing the wafer on the wafer stage 93 with the reticle mounted on the reticle stage 95, is produced by an illumination optical system 99.

The wafer stage 93 is scanned in synchronism with the reticle stage 95. During the scan of the reticle stage 95 and the wafer stage 93, the positions of these stages are continuously detected by interferometers, respectively, and the detected positions are fed back to driving units for the reticle stage 95 and the wafer stage 93. With this arrangement, the scan start positions of them can be synchronized with each other exactly and, additionally, the scan speed in a constant-speed scan region can be controlled very precisely.

With the scan motion of the stages relative to the projection optical system 97, the reticle pattern is exposed to the wafer, whereby the circuit pattern is transferred to the latter.

This embodiment uses at least one of a reticle stage and a wafer stage, as a stage mechanism having an anti-vibration system according to any one of the embodiments described hereinbefore. Therefore, even if the supply pressure to the pressure control valve changes, an unwanted change of the output pressure of the pressure control valve due to the influence of the supply pressure change can be prevented. As a result, the internal pressure of the air spring can be controlled appropriately, and vibration damping can be controlled stably. Thus, a high speed and high precision exposure apparatus operation is assured.

While the invention has been described with reference to the structures disclosed herein, it is not confined to the details set forth and this application is intended to cover such modifications or changes as may come within the purposes of the improvements or the scope of the following claims.

What is claimed is:

1. An anti-vibration system for supporting a table, comprising:

a gas spring for supporting the table;

pressure control means for controlling an internal pressure of said gas spring;

a pressure sensor for detecting a supply pressure to be supplied to said pressure control means;

control means for controlling said pressure control means in accordance with a detection output signal of said pressure sensor; and variable gain compensation means for performing gain compensation to a control signal of said pressure control means in accordance with a detection signal of said pressure sensor, wherein, when a pressure which is in a balanced state is denoted by $P_{SO}$, an input signal, with an assumption that the supply pressure is $P_{SO}$ and is unchangeable, is denoted by $i_0$, and a pressure detected by said pressure sensor is denoted by $P_S$, said variable gain compensation means produces an input signal i in accordance with the following equation:

$$i = (P_{SO}/P_S) \times i_0.$$

2. An anti-vibration system according to claim 1, wherein said anti-vibration system comprises a plurality of gas springs for supporting the table, and wherein plural pressure sensors are provided in gas supplying passageways, respectively, for supplying gases to said pressure sensors individually.

3. An exposure apparatus including an anti-vibration system as recited in claim 1.

4. An anti-vibration system for supporting a table, comprising:

a gas spring that supports the table;

a pressure control valve that controls an internal pressure of said gas spring;

a pressure sensor that detects a supply pressure to be supplied to said pressure control valve;

a controller that controls said pressure control valve in accordance with a detection output signal of said pressure sensor; and a variable gain compensator that performs gain compensation to a control signal for said pressure control valve in accordance with a detection signal of said pressure sensor, wherein, when a pressure which is in a balanced state is denoted by $P_{SO}$, an input signal, with an assumption that the supply pressure is $P_{SO}$ and is unchangeable, is denoted by $i_0$, and a pressure detected by said pressure sensor is denoted by $P_S$, said variable gain compensator produces an input signal i in accordance with the following equation:

$$i=(P_{SO}/P_S)\times i_0.$$

5. An anti-vibration system according to claim 4, wherein said anti-vibration system includes more than one of said gas spring and more than one of said pressure sensor.

6. An anti-vibration system according to claim 4, wherein said controller controls said pressure control valve so as to reduce an influence due to a change in the supply pressure.

7. An exposure apparatus including an anti-vibration system as recited in claim 4.

8. An anti-vibration system for supporting a table, comprising:
   a gas spring for supporting the table;
   pressure control means for controlling an internal pressure of said gas spring;
   a pressure sensor for detecting a supply pressure to be supplied to said pressure control means;
   control means for controlling said pressure control means in accordance with a detection output signal of said pressure sensor; and
   offset adding means for adding an offset signal to a detection signal of said pressure sensor,
   wherein, when a pressure which is in a balanced state is denoted by $P_{SO}$, an input signal, with an assumption that the supply pressure is $P_{SO}$ and is unchangeable, is denoted by $i_0$, and a pressure detected by said pressure sensor is denoted by $P_S$, said offset adding means produces an offset signal $\Delta i$ in accordance with the following equation:

$$\Delta i=(P_{SO}/P_S-1)\times i_0.$$

9. An anti-vibration system for supporting a table, comprising:
   a gas spring that supports the table;
   a pressure control valve that controls an internal pressure of said gas spring;
   a pressure sensor that detects a supply pressure to be supplied to said pressure control valve;
   a controller that controls said pressure control valve in accordance with a detection output signal of said pressure sensor; and
   an offset adding unit that adds an offset signal to a detection signal of said pressure sensor,
   wherein, when a pressure which is in a balanced state is denoted by $P_{SO}$, an input signal, with an assumption that the supply pressure is $P_{SO}$ and is unchangeable, is denoted by $i_0$, and a pressure detected by said pressure sensor is denoted by $P_S$, said offset adding unit produces an offset signal $\Delta i$ in accordance with the following equation:

$$\Delta i=(P_{SO}/P_S-1)\times i_0.$$

10. A method of controlling an anti-vibration system for supporting a table, comprising:
    a detecting step for detecting a supply pressure of a gas to be supplied to a pressure control valve that controls an internal pressure of a gas spring for supporting the table;
    a gain compensating step for performing gain compensation for an input signal to the pressure control valve on the basis of the detection at said detecting step; and
    a driving step for driving the pressure control valve on the basis of the gain-compensated input signal,
    wherein, when a pressure which is in a balanced state is denoted by $P_{SO}$, an input signal, with an assumption that the supply pressure is $P_{SO}$ and is unchangeable, is denoted by $i_0$, and a pressure detected in said detecting step is denoted by $P_S$, an input signal i is produced in accordance with the following equation:

$$i=(P_{SO}/P_S\times i_0).$$

11. A method of controlling an anti-vibration system for supporting a table, comprising:
    a supply pressure detecting step for detecting a supply pressure of a gas to be supplied to a pressure control valve that controls an internal pressure of a gas spring for supporting the table;
    an offset signal producing step for producing an offset signal for the pressure control valve on the basis of the detection at said supply pressure detecting step; and
    a driving step for driving the pressure control valve on the basis of the produced offset signal,
    wherein, when a pressure which is in a balanced state is denoted by $P_{SO}$, an input signal, with an assumption that the supply pressure is $P_{SO}$ and is unchangeable, is denoted by $i_0$, and a pressure detected in said pressure detecting step is denoted by $P_S$, an input signal i is produced in accordance with the following equation:

$$i=(P_{SO}/P_S)\times i_0.$$

* * * * *